(12) United States Patent
Akdim et al.

(10) Patent No.: US 10,888,803 B2
(45) Date of Patent: Jan. 12, 2021

(54) SEPARATOR

(71) Applicant: FMC Separation Systems, BV, Arnhem (NL)

(72) Inventors: Mohamed Reda Akdim, Nieuwegen (NL); Arturo Ernesto Menchaca Lobato, Wageningen (NL)

(73) Assignee: FMC Separation Systems, BV, Arnhem (NL)

( * ) Notice: Subject to any disclaimer, the term of this patent is extended or adjusted under 35 U.S.C. 154(b) by 0 days.

(21) Appl. No.: 16/483,389

(22) PCT Filed: Feb. 27, 2017

(86) PCT No.: PCT/EP2017/054457
§ 371 (c)(1),
(2) Date: Aug. 2, 2019

(87) PCT Pub. No.: WO2018/153491
PCT Pub. Date: Aug. 30, 2018

(65) Prior Publication Data
US 2020/0009475 A1 Jan. 9, 2020

(51) Int. Cl.
*B01D 17/06* (2006.01)
*C10G 33/02* (2006.01)
(Continued)

(52) U.S. Cl.
CPC .......... *B01D 17/06* (2013.01); *B01D 17/0211* (2013.01); *C02F 1/48* (2013.01);
(Continued)

(58) Field of Classification Search
CPC .............................. C10G 33/02; B01D 17/016
See application file for complete search history.

(56) References Cited

U.S. PATENT DOCUMENTS 1,305,125 A * 5/1919 Harris ..................... C08L 95/00
106/164.6
1,405,125 A * 1/1922 Harris .................... C10G 33/02
204/563
(Continued)

FOREIGN PATENT DOCUMENTS

| EP | 0 166 479 A1 | 1/1986 |
|---|---|---|
| GB | 941 129 A | 11/1963 |
| WO | WO 03/049834 A1 | 6/2003 |

*Primary Examiner* — Brian W Cohen
*Assistant Examiner* — Ho-Sung Chung

(57) ABSTRACT

The present invention provides a separator comprising a vessel (1) and an electrode assembly (2), wherein the vessel (1) has an inlet section (3), a main settling section (14) and an outlet section (4) and comprises a fluid inlet (5) arranged in the inlet section (3), and an oil outlet (7) and a water outlet (8) arranged in the outlet section (4); the electrode assembly (2) is arranged in the inlet section and comprises at least one fluid pipe (9) and at least one rod-shaped electrode (10), the fluid pipe surrounds at least parts of the rod-shaped electrode and comprises a pipe inlet (11) arranged in the inlet section and a pipe outlet (12) arranged in fluid communication with the main settling section, wherein a liquid obstruction element (13) is arranged downstream the fluid inlet, such that at least a major part of a liquid component of a fluid stream entering the inlet section via the fluid inlet, during use, may be forced to pass through the at least one fluid pipe via the pipe inlet before entering the main settling section.

13 Claims, 4 Drawing Sheets

(51) Int. Cl.
*B01D 17/02* (2006.01)
*C02F 1/48* (2006.01)
C02F 101/32 (2006.01)
C02F 103/36 (2006.01)

(52) U.S. Cl.
CPC .......... *C10G 33/02* (2013.01); *C02F 2101/32* (2013.01); *C02F 2103/365* (2013.01)

(56) References Cited

U.S. PATENT DOCUMENTS

| | | | |
|---|---|---|---|
| 3,186,933 A | | 6/1965 | Güpner |
| 3,701,723 A | * | 10/1972 | Cole ...................... C10G 33/02 |
| | | | 204/563 |
| 3,898,152 A | * | 8/1975 | Hodgson ................ B01D 17/06 |
| | | | 204/673 |
| 6,315,898 B1 | * | 11/2001 | Bull .................. B01D 17/0211 |
| | | | 210/187 |
| 9,095,790 B2 | | 8/2015 | Sams et al. |
| 2009/0159534 A1 | * | 6/2009 | Bjorklund ................ B03C 3/49 |
| | | | 210/708 |
| 2009/0269256 A1 | | 10/2009 | Strand et al. |
| 2015/0290559 A1 | * | 10/2015 | Collins, Jr. ............ B01D 17/12 |
| | | | 204/555 |
| 2017/0175008 A1 | * | 6/2017 | Sprenkel ................ C10G 32/02 |

* cited by examiner

SEPARATOR

FIELD OF THE INVENTION

The present invention relates to the field of electrocoalescers, and more particular to a separator comprising an electrocoalescer.

BACKGROUND

Phase separation vessels are widely used in the oil and gas industry to divide fluid streams into their constituting phases. This is typically done along a multi-stage process comprising gas/liquid separators, gas/oil/water separators, and oil/water separators. Sand and other solid particles are typically also removed along this process.

To improve the efficiency of gas/oil/water and oil/water separators they often comprise an electrocoalescer device, which facilitates the separation of for instance water droplets dispersed in the oil phase. Robust and efficient electrocoalescers able to handle high watercuts and high temperatures can greatly increase the overall efficiency of separators in crude oil processing systems.

US 2009/0269256 A1 discloses a vessel-based electrocoalescer separator comprising multiple corrugated plate-shaped electrodes arranged downstream an inlet section in a separator vessel.

WO 03/049834 A1 discloses a vessel-based electrocoalescer separator comprising multiple plate-shaped electrodes arranged downstream an inlet section in a separator vessel.

A common feature of the prior art vessel-based electrocoalescer separators is the arrangement of the electrocoalescer assembly (i.e. the electrodes) in the middle of the vessel, i.e. at a distance from the inlet section of the vessel. This arrangement is to allow for an initial phase separation of the fluid stream before it passes the electrocoalescer assembly. However, to keep the vessel compact, the prior art solutions have a relatively short settling section after the fluid stream has passed through the electrocoalescer assembly. This results in reduced efficiency of the setting process. Another common feature of the prior art vessel-based electrocoalescer separators is that the fluid is typically electrostatically treated at relatively low flow velocities. This results in a reduced collision rate between water droplets, leading to an overall reduction in the droplet-droplet coalescence rate. The low flow velocity also increases the probability of either secondary droplet formation (i.e. partial re-emulsification) or water droplet chain formation. Further, the low flow velocity also increases the probability of fouling in the cells. All the above factors limit the oil dehydration efficiency the system can achieve.

The goal of the present invention is to provide a vessel-based electrocoalescer separator which avoids or minimizes at least some of the disadvantages of the prior art electrocoalescer separators.

SUMMARY OF THE INVENTION

The invention is defined by the appended claims and in the following:

The present invention provides a separator (i.e. a fluid separator) comprising a vessel and an electrode assembly, wherein
the vessel has an inlet section, a main settling section and an outlet section and comprises a fluid inlet arranged in the inlet section, and an oil outlet and a water outlet arranged in the outlet section;
the electrode assembly is arranged in the inlet section and comprises at least one fluid pipe and at least one rod-shaped electrode, the fluid pipe surrounds at least parts of the rod-shaped electrode and comprises a pipe inlet (i.e. a fluid inlet of the pipe) arranged in the inlet section and a pipe outlet (i.e. a fluid outlet of the pipe) arranged in fluid communication with the main settling section, wherein
a liquid obstruction element is arranged downstream the fluid inlet, such that a major part of a liquid component of a fluid stream entering the inlet section during use may be forced to pass through the fluid pipes via the pipe inlets before entering the main settling section.

In one embodiment, the separator comprises multiple fluid pipes and multiple rod-shaped electrodes, wherein each fluid pipe surrounds at least parts of a cooperating rod-shaped electrode; that is, the electrode assembly of the separator comprises multiple fluid pipes and multiple rod-shaped electrodes.

In one embodiment of the separator, the major part, or even all, of the liquid component is forced to pass through the at least one or multiple fluid pipe(s).

Each fluid pipe features one of the rod-shaped electrodes arranged at least partly within the fluid pipe providing an annular flow channel between the inner surface of the fluid pipe and an outer surface of the electrode, i.e. each fluid pipe surrounds at least parts of a rod-shaped electrode. Preferably, a major part, or all, of the rod-shaped electrode is arranged within the fluid pipe.

In one embodiment of the separator, the liquid obstruction element is a plate element comprising a through-hole for each of the multiple fluid pipes, each through-hole provides a fluid tight passage for one of the multiple fluid pipes and/or is connected to the pipe outlet of one of the multiple fluid pipes. At least a part of the circumference of the plate element is sealed to an adjacent inner wall of the vessel or to a support ring or other element that is adjacent (e.g. welded) to the inner wall of the vessel.

In one embodiment of the separator, the outer surfaces of the fluid pipes are separated to provide a space between the fluid pipes. The space allows a fluid stream entering the inlet section to flow between the fluid pipes during use. The space provide free passage of a fluid between the fluid pipes.

The space is in fluid communication with the fluid inlet in the inlet section, such that a fluid flow entering the inlet section may pass through said space before entering the pipe inlets. The space allows for an initial bulk separation of a fluid stream entering the separator during use, thus reducing the required number of rod-shaped electrodes, power consumption, while also increasing the coalescence and separation performance of the separator. The same advantageous effect is obtained in case of an electrode assembly featuring a single fluid pipe.

In one embodiment of the separator, the fluid inlet is connected to an inlet device having at least one fluid outlet, and the at least one fluid outlet is arranged directly above, in between, below or upstream the multiple fluid pipes of the electrode assembly. In an advantageous embodiment, the at least one fluid outlet is arranged directly above the electrode assembly.

In one embodiment, the separator comprises a support element arranged at the pipe inlets of the multiple fluid pipes, preferably the support element is a perforated support element. The support element may be any element able to support the position of the fluid pipes while at the same time allowing a fluid stream to flow from the space separating the fluid pipes and into the pipe inlets. The perforated support element may for instance comprise a mesh or multiple stacked plate elements.

In one embodiment of the separator, the perforated support element is a perforated support plate comprising at least one through-hole for each of the multiple fluid pipes and multiple perforations. Each through-hole provides passage for one of the multiple fluid pipes or/and is connected to the channel inlet of one of the multiple fluid pipes, such that a liquid component of a fluid stream entering the inlet section is forced to pass through the perforations of the perforated support plate before entering the pipe inlets of the multiple fluid pipes. The perforations of the perforated support plate are in addition to the through-holes. The perforated support plate may be any type of plate-shaped element, which provides both support for the multiple fluid pipes and allows passage of a fluid from the space between the fluid pipes to the pipe inlets.

In one embodiment of the separator, at least one of the electrodes may be selectively turned off.

In one embodiment of the separator, a bypass line comprising a valve is arranged between the inlet section and the main settling section, such that a water continuous phase in the inlet section may bypass the multiple fluid pipes to enter the main settling section.

In one embodiment of the separator, the vessel is a cylindrical vessel. Preferably, the centerline of the cylindrical vessel is substantially horizontal during use.

In one embodiment of the separator, the inlet section is arranged upstream the main settling section and the main settling section is arranged upstream the outlet section.

In one embodiment of the separator, the outlet section comprises a gas outlet.

In one embodiment of the separator, the liquid obstruction element is arranged such that a gaseous component of a fluid stream is allowed to bypass the fluid pipes, during use, to enter the main settling section.

The term "perforated support element" is in the present specification intended to mean a plate-shaped element having through-going openings/perforations extending from one side of the plate shaped element to the other side of the plate-shaped element, such as a mesh, an assembly of stacked plates and a simple plate having multiple through-going openings.

In a further aspect, the present invention provides an electrode assembly comprising at least one fluid pipe and a rod-shaped electrode, wherein the fluid pipe surrounds at least a major part of the rod-shaped electrode, and wherein the rod-shaped electrode is arranged non-concentric/offset, or at an inclination, with respect to the centerline of the fluid pipe.

SHORT DESCRIPTION OF THE DRAWINGS

An embodiment of the invention is described in detail by reference to the following drawings.

DETAILED DESCRIPTION OF THE INVENTION

Figure 1:
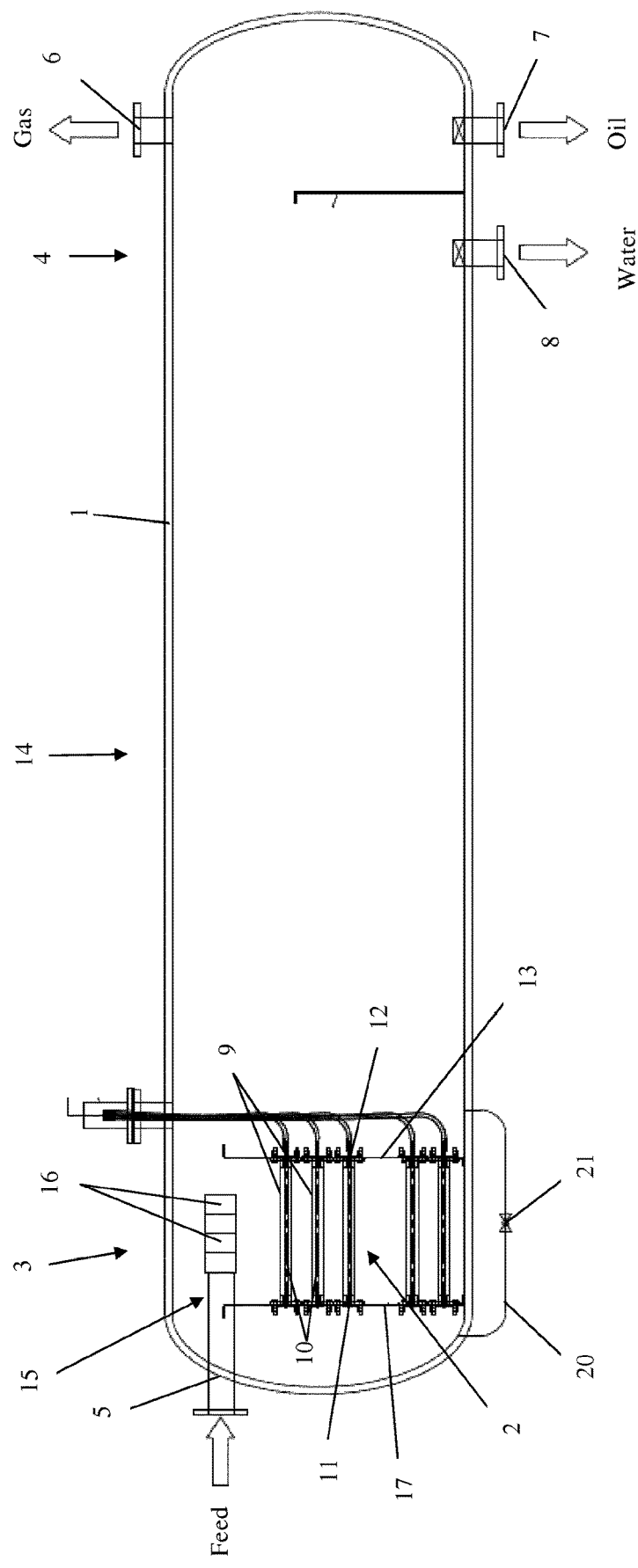
FIG. 1 is a cross-sectional side view of a separator according to the invention.
Figure 2:
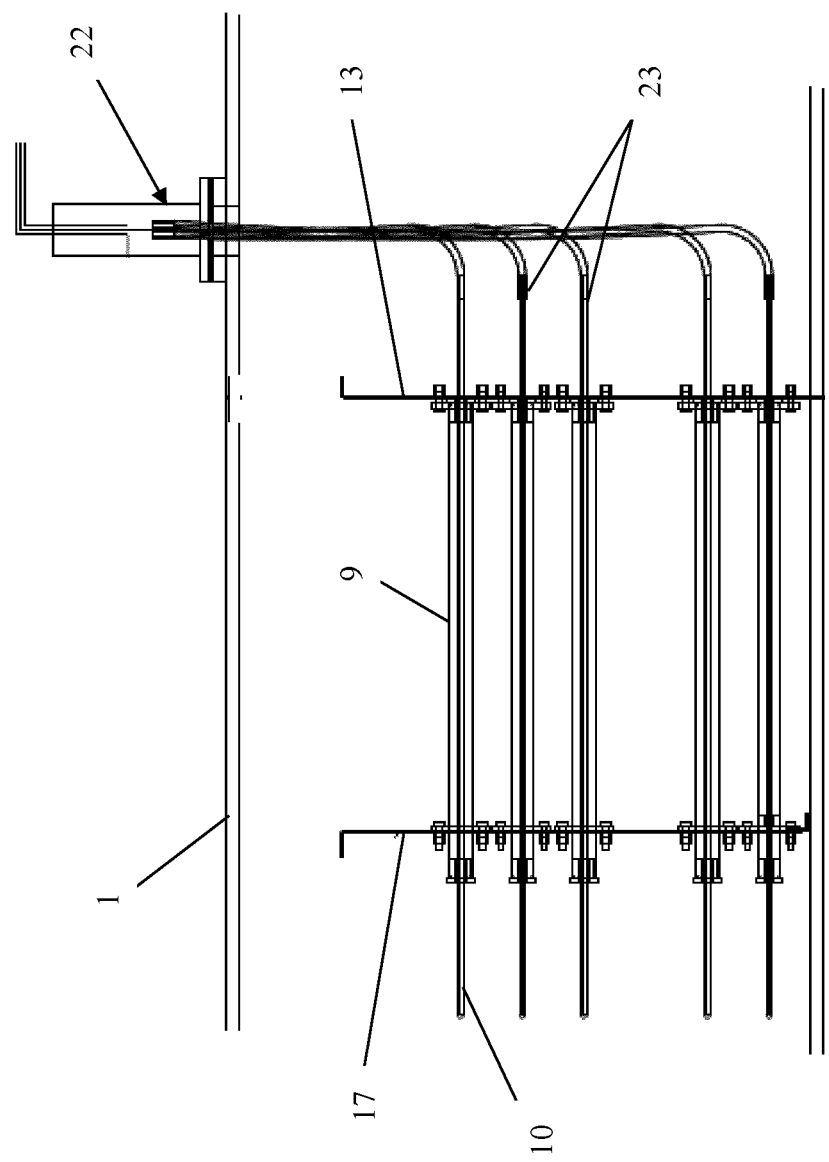
FIG. 2 is an enlarged view of the electrode assembly of the separator in FIG. 1.
Figure 4:
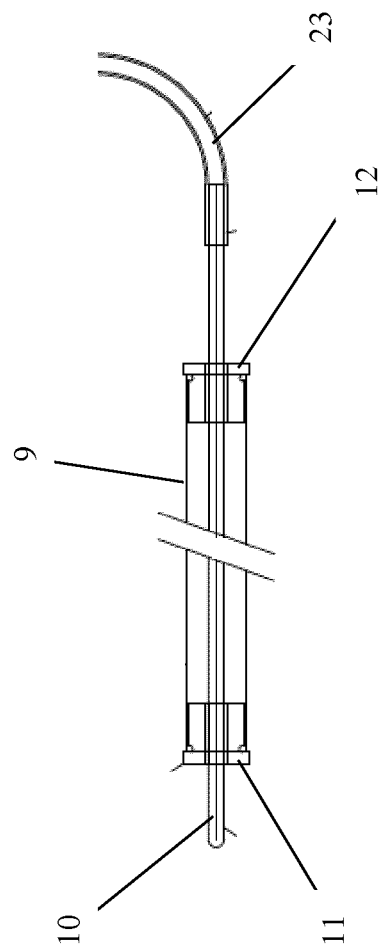
FIG. 4 is an enlarged view of a fluid channel and an electrode.
Figure 6:
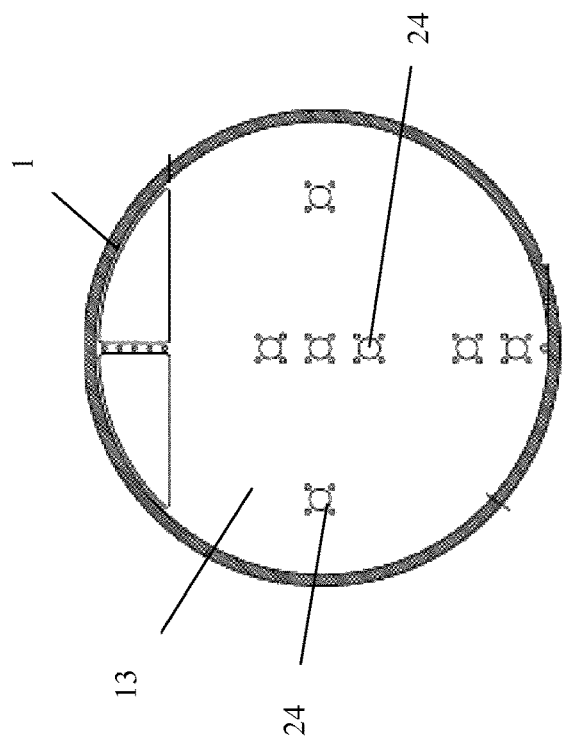
FIG. 6 is a cross-sectional front view of a liquid obstruction element.

A separator according to the invention is shown in FIG. 1. The main components of the separator are the horizontal cylindrical vessel 1 and the electrode assembly 2 arranged within the vessel. The cylindrical vessel 1 features an inlet section 3, a main settling section 14 and an outlet section 4. A fluid inlet 5 for an incoming fluid stream is connected to an inlet device 15 having at least one fluid outlet 16 arranged in the inlet section 3. The vessel also features a gas outlet 6, an oil outlet 7 and a water outlet 8 arranged in the outlet section 4. In some instances, when the fluid stream to be separated does not comprise significant amounts of a gaseous phase, the gas outlet 6 is not required. The electrode assembly 2 comprises multiple pipes 9 (i.e. fluid pipes) and rod-shaped electrodes 10, each of which is arranged along the centerline of a corresponding pipe (see FIGS. 2 and 4 for an enlarged view of the pipes and electrodes). A rod-shaped electrode and a cooperating fluid pipe provide a single electrode cell. The pipes comprise an inlet 11 (i.e. channel inlet) arranged in the inlet section 3 and an outlet 12 (i.e. channel outlet) arranged in fluid communication with the main settling section 14. To guide a fluid flow entering the vessel via the fluid inlet 5, a plate element 13 (i.e. a liquid obstruction element) is arranged downstream of said fluid inlet. The plate element comprises a through-hole 24 for each of the multiple pipes 9 (see FIG. 6). Each of the through-holes provides a fluid tight passage for a corresponding pipe 9 by being connected to the outlet 12 of the pipe. In this manner, a liquid component or phase of the fluid flow is forced to pass through the pipes 9 via the inlets 11 in order to enter the main settling section 14. Any gaseous component or phase separated out of the fluid flow in the inlet section 3 is allowed to pass above the pipes 9 (or above the plate element 13) to enter the main settling section. A gaseous component/phase may also enter the main settling section via the upper pipes 9 when a liquid level is below said pipes.

Further, the pipes 9 are arranged at a distance to each other to provide a space there between. The space allows free passage of the fluid flow entering the vessel via the fluid outlet 16 arranged directly above the pipes 9 of the electrode assembly 2.

In the present embodiment, the rod-shaped electrodes are arranged concentric in relation to the fluid pipes 9. However, when the fluid pipes are arranged substantially horizontal during use, it may be beneficial to have a little offset or some inclination of the rod-shaped electrode with respect to the centreline of the fluid pipe (the fluid pipe functions as a grounding cell). In this manner, it is possible to accommodate a free-water stream at the bottom of the electrode cell (i.e. the bottom of the fluid pipe of the electrode cell) without affecting the electrocoalescence performance. Such an offset or inclination may help to achieve higher coalescence performance and help prevent secondary droplet formation (re-emulsification).

Figure 5:
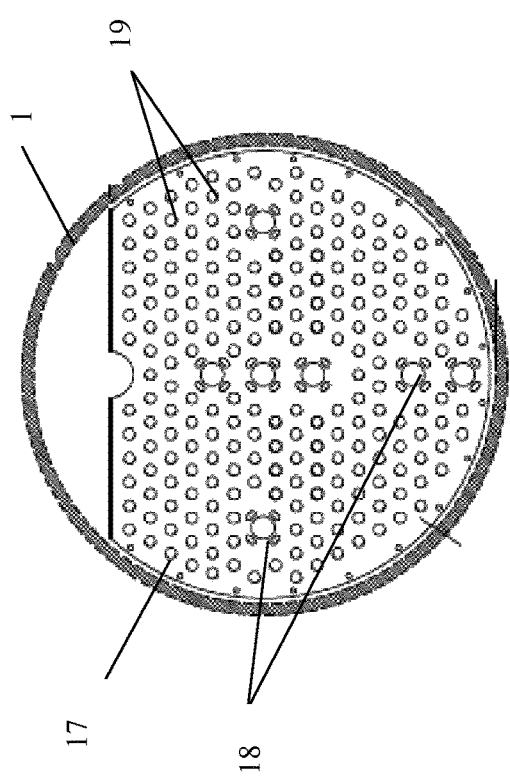
FIG. 5 is a cross-sectional front view of a perforated support plate.

A perforated support plate 17 (i.e. a perforated support element) is arranged close to the inlets 11 of the pipes. The perforated support plate comprises a through-hole 18 for each of the pipes 9 and multiple perforations 19 (see FIG. 5). Each through-hole provides passage for one of the pipes 9 or is connected to one of the inlets 11. The function of the support plate (i.e. the support element) is primarily to provide support for the multiple pipes 9. Further, the support plate enhances bulk separation of the gas-continuous, oil-continuous and water-continuous phases before the oil-continuous (and the water-continuous) phase passes the electrodes 10. The perforation of the support plate, and the resulting net free area through which a fluid stream may pass before entering the pipe inlets, may be varied.

The illustrated embodiment comprises seven sets of fluid pipes 9 and corresponding rod-shaped electrodes 10 (i.e. seven electrode cells). Depending on the application and design of the separator, the number and position/distribution of the electrode cells may be varied. In the illustrated embodiment, the fluid pipes 9 have a circular cross-section. In other embodiments, the fluid pipes may have any suitable cross-section, such as polygonal, i.e. rectangular, hexagonal, pentagonal etc. as well as elliptic.

The vessel may alternatively feature a bypass line 20 with a valve 21 for allowing a water continuous phase to bypass the pipes of the electrode assembly if required. The valve 21 may for instance be an automatic control valve controlled by sensor(s) measuring the liquid level or oil/water interface level in the inlet section. In further embodiments of the inventive separator, the valve may be replaced by a pump. Further, the bypass line 20 may be replaced by an extraction line arranged such that a water continuous phase may be transported to another vessel or to another section/part of a production system for further treatment, for instance to a produced water treatment system. The valve 21 enables the adjustment/control of the difference in liquid level between the inlet section and the settling section of the vessel, thus increasing the operational range of the separator.

The electrodes 10 of the electrode assembly may also be switched off selectively, such that lower power consumption may be obtained, for instance by switching off the lowermost electrode(s) if a large water continuous phase is present. A selected electrode may for instance be switched off upon detecting a water continuous phase in the corresponding fluid pipe 9 of the electrode cell.

Depending on the application, one or more internal bypass channels may be included at the lower part of the electrode assembly, either in addition to or instead of bypass line 20. Such internal bypass channels may comprise a valve similar to valve 21, and may for example be similar to pipes 9, but without electrodes, and/or perforation(s) at, or a passage below, the lower part of plate element 13, where a water continuous flow, if present, can pass through.

The separator may also include a fluid/chemical injection system (not shown). Such a system may comprise an arrangement of spray nozzles, where each spray nozzle feeds the injection fluid/chemical at the inlet to each cell of the electrocoalescer. The injection fluid/chemical can have several functions, such as a chemical demulsifier, anti-fouling, fresh-water injection (e.g. for desalting applications), steam-injection for cleaning purposes, anti-corrosive fluid, etc.

Figure 3:
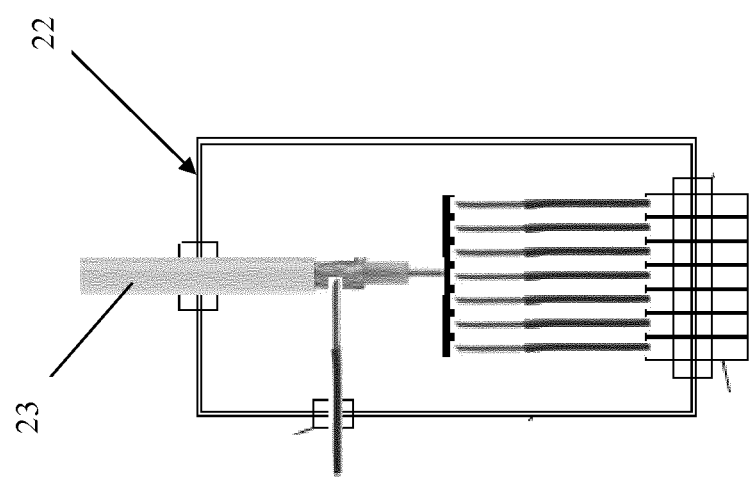
FIG. 3 is an enlarged view of the junction box connecting the power supply to the individual electrodes.

The electrode assembly 2 uses alternating current, high-voltage and high-frequency, to generate an intense electric field to polarize and rapidly coalesce dispersed water droplets in an oil-continuous phase. During operation, the strength of the electric field can be adjusted to reach an optimum value where water droplet-droplet coalescence is maximized while secondary droplet formation is prevented. The larger water droplets will separate much faster from the oil-continuous phase in the main settling section 14. The electrode assembly is connected to a power source by a junction box 22 (see FIG. 3). In this particular embodiment, only one channel 23 is connected to the power supply. However, in most instances multiple channels will be used.

In use, a fluid flow to be separated will enter the inlet section via the fluid outlet(s) 16 of the inlet device 15. Due to the space between the pipes 9, the electrode assembly 2 may be arranged directly below the fluid outlet(s) 16. In other embodiments of the inventive separator, an inlet device and corresponding fluid outlets may advantageously be arranged at any suitable position in the inlet section, such as centrally arranged between the fluid pipes 9 (i.e. between the electrode cells). Further, the inlet device may be any type of device suitable for introducing a fluid stream to the inlet section, such as a vane-type inlet device, a cyclonic inlet device or a pipe section. In the inlet section, at least parts of any gaseous component in the fluid flow will separate from the liquid phase and pass above the plate element 13 from the inlet section to the main settling section. If the liquid phase is at a level not covering the upper fluid pipes 9, the gas phase may also pass to the main settling section via the upper fluid pipes. The liquid phase will partially separate into a high-density water phase and a low-density oil phase. In extreme case of extra heavy oil, the density of the phases may be reversed. The plate element 13 and the perforated support plate 17 guides the liquid phases through the perforations 19 of the perforated support plate before the liquid phases enters the pipe inlets 11 of the electrode assembly. When passing through the pipes and electrodes of the electrode assembly, water droplets dispersed in the oil phase will coalesce and an improved phase separation is obtained. By having the electrode assembly 2 arranged in the inlet section 3, the size/length of the main settling section 14 is increased compared to the prior art separators and an improved separation may be obtained by the same vessel size. Alternatively, the invention may provide a more compact separation vessel having the same separation efficiency as larger prior art vessels. Further, the flow rate (or speed of the flow) of the oil phase through the electrodes is much higher than what is achieved in prior art electrocoalescer separators. The increased flow rate greatly increases the coalescence efficiency due to the increased droplet-droplet collision rate, reduces the probability of droplet chain formation due to the relatively higher flow turbulence, prevents the appearance of secondary droplet formation (re-emulsification) and prevents fouling of the electrode assembly.

The invention claimed is:

1. A separator comprising:
    a vessel having an inlet section, a main settling section, an outlet section, a fluid inlet arranged in the inlet section, an oil outlet arranged in the outlet section and a water outlet arranged in the outlet section;
    an electrode assembly which is arranged in the inlet section and comprises at least one fluid pipe and at least one rod-shaped electrode, the at least one fluid pipe surrounding at least a part of the at least one rod-shaped electrode and comprising a pipe inlet arranged in the inlet section and a pipe outlet arranged in fluid communication with the main settling section; and
    a liquid obstruction element arranged downstream of the fluid inlet, such that at least a major part of a liquid component of a fluid stream entering the inlet section via the fluid inlet, during use, is forced to pass through the at least one fluid pipe via the pipe inlet before entering the main settling section;
    wherein the liquid obstruction element is positioned downstream of the pipe inlet of the at least one fluid pipe.

2. The separator according to claim 1, wherein the electrode assembly comprises multiple fluid pipes and multiple rod-shaped electrodes, and wherein each fluid pipe surrounds at least a part of a corresponding rod-shaped electrode.

3. The separator according to claim 2, wherein the liquid obstruction element is a plate element comprising a through-hole for each of the multiple fluid pipes, and wherein each through-hole either provides a fluid tight passage for a corresponding one of the multiple fluid pipes or is connected to the pipe outlet of a corresponding one of the multiple fluid pipes.

4. The separator according to claim 2, wherein the multiple fluid pipes are separated to provide spaces between the multiple fluid pipes.

5. The separator according to claim 2, wherein the fluid inlet is connected to an inlet device having at least one fluid outlet which is arranged directly above, in between, below or upstream of the multiple fluid pipes of the electrode assembly.

6. The separator according to claim 2, further comprising a support element arranged at the pipe inlets of the multiple fluid pipes.

7. The separator according to claim 6, wherein the support element is a perforated support plate comprising a number of through-holes and multiple perforations, each through-hole providing a passage for a corresponding one of the multiple fluid pipes or being connected to the pipe inlet of a corresponding one of the multiple fluid pipes, such that a liquid component of a fluid stream entering the inlet section is forced to pass through the multiple perforations of the perforated support plate before entering the pipe inlets of the multiple fluid pipes.

8. The separator according to claim 2, wherein at least one of the rod-shaped electrodes may be selectively turned off, such that a water continuous phase may be allowed passage through the corresponding fluid pipe.

9. The separator according to claim 2, further comprising a bypass line which comprises a valve and is arranged between the inlet section and the main settling section, such that a water continuous phase in the inlet section may bypass the multiple fluid pipes via the bypass line to enter the main settling section.

10. The separator according to claim 2, wherein the vessel is a cylindrical vessel having a centerline which is substantially horizontal during use.

11. The separator according to claim 2, wherein the inlet section is arranged upstream of the main settling section and the main settling section is arranged upstream of the outlet section.

12. The separator according to claim 2, wherein the outlet section comprises a gas outlet.

13. The separator according to claim 2, wherein the liquid obstruction element is arranged such that a gaseous component of a fluid stream entering the inlet section, during use, is allowed to bypass the multiple fluid pipes to enter the main settling section.

\* \* \* \* \*